UNITED STATES PATENT OFFICE.

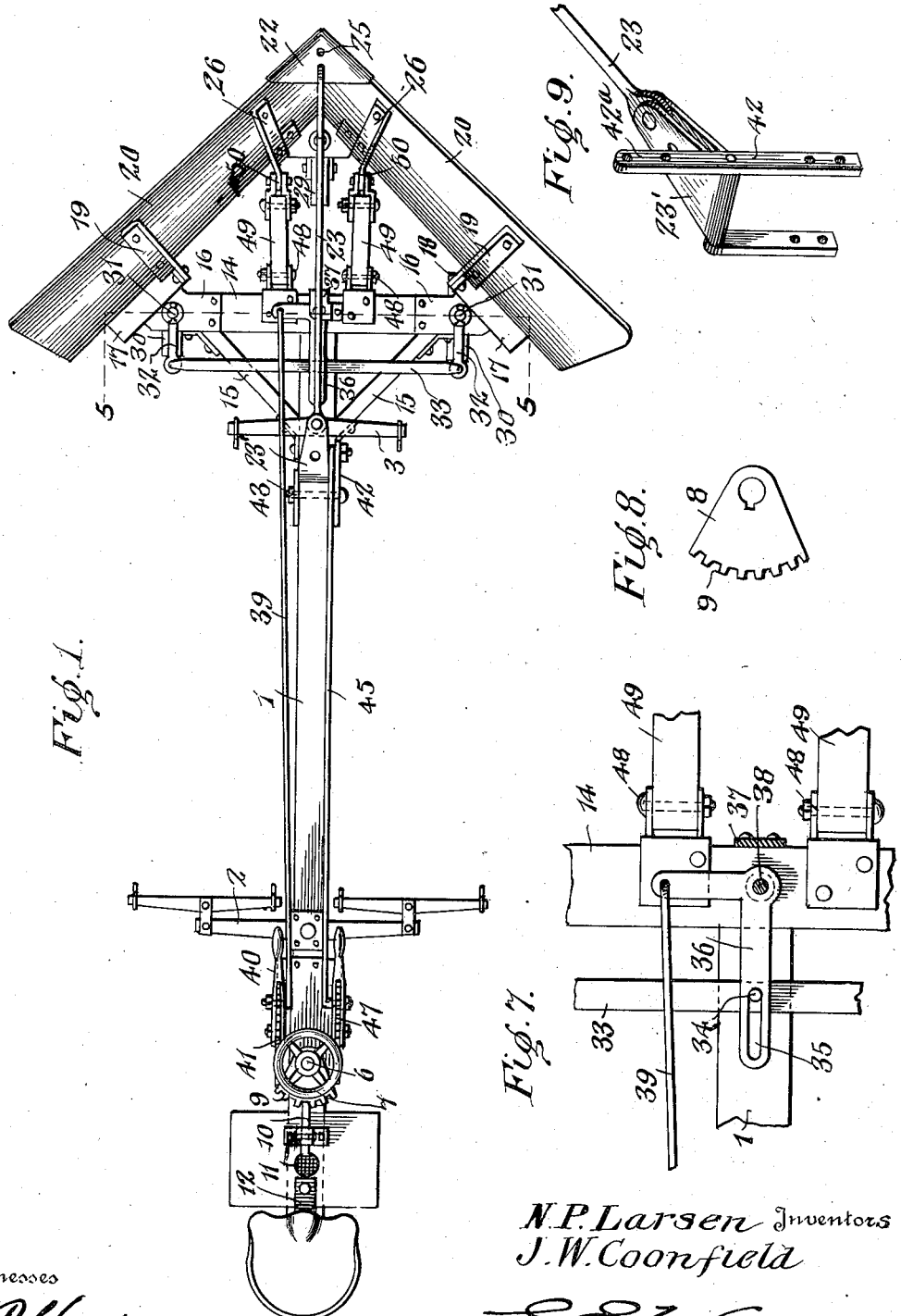

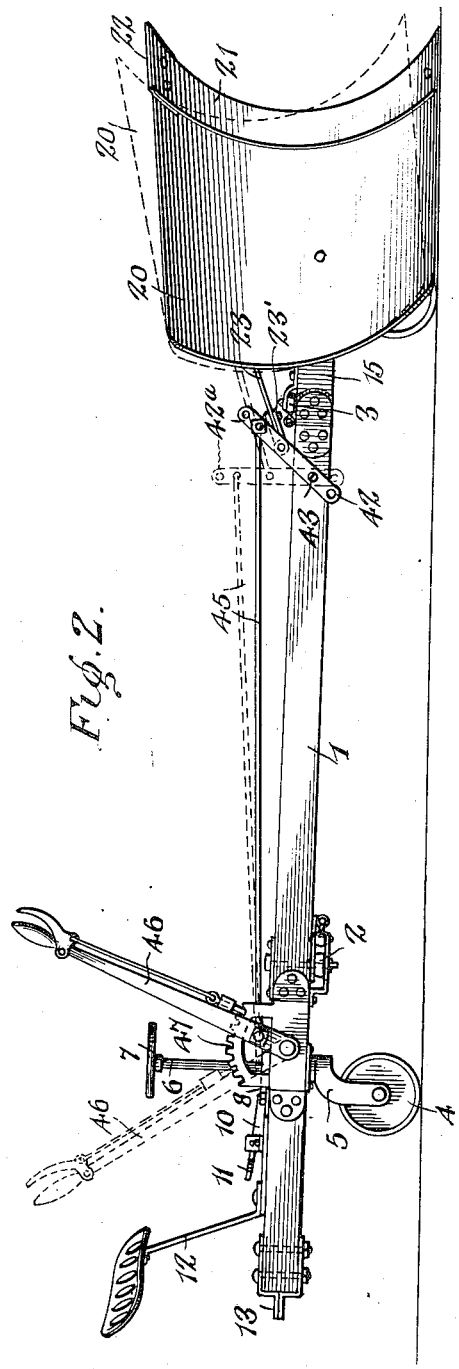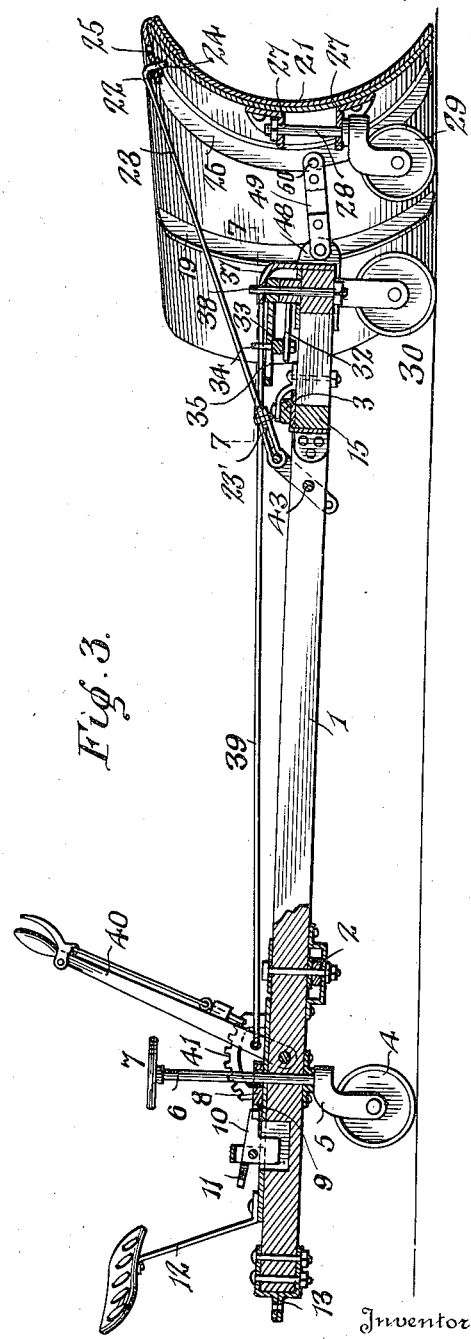

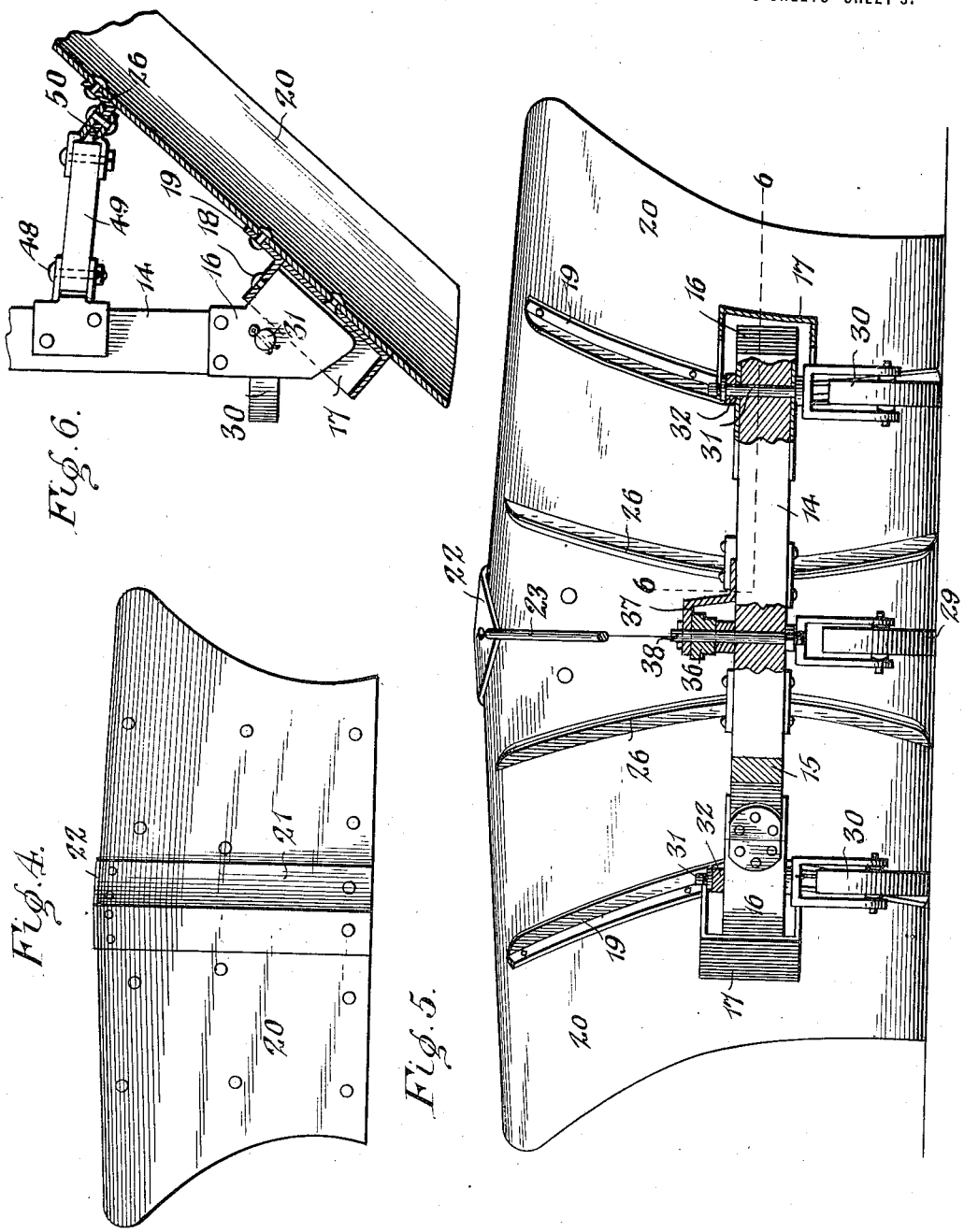

NELS P. LARSEN AND JOHN W. COONFIELD, OF FORT DODGE, KANSAS.

SNOW-PLOW.

1,188,281. Specification of Letters Patent. Patented June 20, 1916.

Application filed October 31, 1914. Serial No. 869,607.

*To all whom it may concern:*

Be it known that we, NELS P. LARSEN and JOHN W. COONFIELD, citizens of the United States, residing at Fort Dodge, in the county of Ford and State of Kansas, have invented certain new and useful Improvements in Snow-Plows, of which the following is a specification.

This invention relates to snow plows and has for its object the production of a simple and efficient means for clearing roads and the like so as to allow the draft animals to travel behind the moldboards of the plow and in this manner more efficiently operate the snow plow.

Another object of the invention is the production of a simple and efficient means for guiding the plow and to enable the draft animals to be readily reversed for pulling the plow out of a drift should the plow become stuck therein.

A still further object of the invention is the production of a simple and efficient means for regulating the depth of cut of the moldboards of the plow from the seat of the operator.

With these and other objects in view this invention consists of certain novel combinations, constructions, and arrangements of parts as will be hereinafter fully described and claimed.

In the accompanying drawings:—Figure 1 is a top plan view of the plow. Fig. 2 is a side elevation thereof. Fig. 3 is a central longitudinal section through the plow. Fig. 4 is a front view of the plow point. Fig. 5 is a section taken on line 5—5, of Fig. 1. Fig. 6 is a horizontal section taken on line 6—6, of Fig. 5. Fig. 7 is a horizontal section taken on line 7—7, of Fig. 3. Fig. 8 is a top plan view of the locking gear for controlling the steering apparatus of the plow. Fig. 9 is a detail perspective of the lifting yoke for regulating the depth of cut of the plow point.

By referring to the drawings it will be seen that 1 designates the draft-pole which carries the usual trees 2 near the rear end thereof for the purpose of attaching the draft animal thereto. The usual breast-pole 3 is also carried by the draft-pole 1 near the forward end thereof for attaching the breast straps of the animal thereto to facilitate in pulling the plow from a bank or drift of snow. A guiding caster wheel 4 is pivotally supported upon a frame 5, which frame is engaged by the steering shaft 6, which steering shaft carries a guiding wheel 7. The steering shaft 6 carries a rack plate 8 as is clearly illustrated in Fig. 8, which rack plate is provided with a series of teeth 9 formed upon its outer edge, which teeth are adapted to be engaged by means of the pivotally mounted latch 10. The latch 10 is provided with a rearwardly extending lip engaging portion 11 for the purpose of facilitating the withdrawing of the latch 10 out of engagement with the teeth 9 so as to allow the position of the steering wheel 4 to be changed in the desired direction. The latch 10, however, will constitute an efficient means for holding the steering wheel 4 in a set position. The latch 10 by being placed in the position as shown in Figs. 1, 2 and 3 will be in an efficient position to be operated by the operator's foot. A seat 12 is carried by the draft-pole 1 near the rear end thereof as is clearly illustrated in Fig. 3. A coupling 13 may be carried by the rear end of the pole 1 for the purpose of attaching a vehicle or other device to the rear of the pole for the purpose of carrying the horses' feed or tools adapted to be used in connection with the snow plow.

The draft-pole 1 carries at its forward end a cross-beam 14, which crossbeam is braced by means of the diagonally extending braces 15 as is clearly illustrated in Fig. 1. The cross-beam 14 is provided with a pair of metallic socket plates 16, one socket plate being secured to each end of the beam 14 as is clearly illustrated in Fig. 1. These socket plates 16 are pivotally connected to a box frame 17 by means of a pivot pin 18. The box frame 17 is fixedly secured to the vertically extending reinforcing angle irons 19 as is clearly illustrated in Figs. 5 and 6 and these angle irons 19 are fixedly mounted upon the moldboards 20. By means of the pivot connection just described it will be seen that the moldboards 20 of the plow point may have a vertical swinging movement.

The plow point comprises a pair of diverging moldboards which are connected at their inner ends by means of a reinforcing cutting plate or plow point 21, the upper end of which is folded over the upper end of the moldboard as is indicated at 22 for constituting a means for allowing the lifting rod 23 to be connected thereto. This lifting rod 23 has its depending end 24 fitted in one of the adjusting apertures 25 of the inwardly turned end 22 of the plate 21. The moldboards of the plow point are also reinforced by means of the inner angle bars 26, which inner angle bars are secured to the moldboards near their adjoining ends. A plurality of journal plates 27 are secured near the adjoining ends of the moldboards of the plow point, and upon these journal brackets 27 is journaled a journal shaft 28 carrying a caster wheel 29 for the purpose of constituting an efficient support for the forward end of the moldboards of the plow point.

A caster wheel 30 is pivotally supported near each end of the transverse-beam 14 upon a pivotally mounted shaft 31. Each of the shafts 31 carries a link 32, and these links are connected by means of a transversely extending link 33. The link 33 carries an upwardly extending pin 34, which upwardly extending pin 34 travels in a longitudinally extending slot 35 of the bell crank lever 36. The bell crank lever 36 is supported upon the transverse-beam 14 by means of a supporting bracket 37 by means of a journal pin 38. It will, therefore, be seen that as the bell crank lever 36 is swung, the direction of travel of the caster wheels 30 will be changed. The bell crank lever 36 is connected to a steering rod 39, which steering rod is connected to a steering lever 40, which lever is provided with the usual means for engaging the quadrant 41 for holding the steering rod 39 and the steering lever 40 in a set position.

The lifting rod 23 engages at its rear end the elevating yoke 42, which elevating yoke is pivotally mounted upon the draft-pole 1 by means of a transversely extending pivot bolt 43. The elevating yoke 42 is engaged by a lifting rod 45, which lifting rod engages the lifting lever 46. The lifting lever 46 carries the usual means of engaging the quadrant 47, whereby the lifting rod 45 may be held in a set position in order to maintain the plow point in a set position or in an adjusted position as is illustrated in dotted lines in Fig. 2.

By carefully considering Figs. 1 and 3 it will be seen that the transversely extending bar 14 carries a plurality of journal brackets 48 to which journal brackets are pivotally connected the moldboard engaging links 49. The moldboard engaging links 49 engage the reinforcing angle bars 26 by being pivotally secured thereto as illustrated at 50.

From the foregoing description it will be seen that a very simple and efficient means has been produced for raising and lowering the forward end of the plow point and at the same time facilitate the guiding of the plow in the desired direction.

It should be further understood that a very simple and efficient means has been produced for attaching the draft animals to the plow so as to facilitate the forward movement of the plow and also in facilitating the pulling of the plow from the snow drift or embankment into which the plow may have been driven.

It should be understood that many minor changes may be involved in the present case without departing from the spirit of the invention so long as the changes fall within the scope of the appended claims.

By carefully considering Fig. 9 it will be seen that the yoke frame 42 is provided with an upwardly extending finger 42ª for engaging the lifting rod 45. This upwardly extending finger 42ª is provided with a plurality of adjusting apertures to regulate the swing of the yoke frame. It will also be seen by carefully considering Fig. 9 that the yoke frame 42 is engaged by means of a folded substantially U-shaped link 23', which link is pivotally secured to the elevating rod 23 which is adapted to raise and lower the moldboard to the plow.

Having thus described the invention what is claimed as new, is:—

1. In a snow-plow of the class described, the combination of a draft-pole, a plow carried upon said draft-pole, a plurality of caster wheels supporting the forward end of said draft-pole, means for connecting said caster wheels together, a crank lever pivotally supported upon the forward end of said draft-pole, said crank lever being connected to said means, a steering rod connected to said crank lever, and an operating lever connected to said steering rod for changing the direction of travel of said caster wheels.

2. In a snow-plow of the class described, the combination of a draft-pole, means for supporting said draft-pole, a plow portion pivotally mounted upon said draft-pole, a yoke frame embracing said draft-pole and comprising a pair of side portions, a finger extending from one of said side portions, a U-shaped link connected to said yoke, an elevating rod connected to said link and said plow portion, a lifting rod connected to the upper end of said finger, means connected to the rear end of said lifting rod for holding said lifting rod in a set position, whereby said yoke will allow said plow portion to be easily adjusted.

In testimony whereof we affix our signatures in presence of two witnesses.

NELS P. LARSEN.
JOHN W. COONFIELD.

Witnesses:
E. RICHARDSON,
R. F. BRUNDAGE.